US011958300B2

(12) United States Patent
Murayama et al.

(10) Patent No.: US 11,958,300 B2
(45) Date of Patent: Apr. 16, 2024

(54) RECORDING APPARATUS

(71) Applicant: SEIKO EPSON CORPORATION, Tokyo (JP)

(72) Inventors: Osamu Murayama, Yamagata-Mura (JP); Shinya Yamazaki, Asahi-Mura (JP)

(73) Assignee: Seiko Epson Corporation, Tokyo (JP)

( * ) Notice: Subject to any disclaimer, the term of this patent is extended or adjusted under 35 U.S.C. 154(b) by 6 days.

(21) Appl. No.: 17/812,319

(22) Filed: Jul. 13, 2022

(65) Prior Publication Data

US 2023/0016614 A1 Jan. 19, 2023

(30) Foreign Application Priority Data

Jul. 16, 2021 (JP) ................................ 2021-117685

(51) Int. Cl.
*B41J 25/308* (2006.01)
*B41J 25/00* (2006.01)

(52) U.S. Cl.
CPC .................................. *B41J 25/003* (2013.01)

(58) Field of Classification Search
CPC ................ B41J 2/04556; B41J 25/3082; B41J 25/3086; B41J 25/308; B41J 25/304; B41J 25/316; B41J 2/2132
See application file for complete search history.

(56) References Cited

U.S. PATENT DOCUMENTS

2016/0129708 A1 5/2016 Sasaki
2018/0339509 A1 11/2018 Momose et al.
2021/0234139 A1* 7/2021 Quinn .................... H10K 50/11
2022/0001666 A1* 1/2022 Kuriyama ............ B41J 2/04586

FOREIGN PATENT DOCUMENTS

JP 2016-088022 A 5/2016
JP 2018-199280 A 12/2018
JP 2021079481 A * 5/2021

OTHER PUBLICATIONS

Oshita, Machine TranslationofJP-2021079481-A, 2021 (Year: 2021).*

* cited by examiner

*Primary Examiner* — Scott A Richmond
(74) *Attorney, Agent, or Firm* — WORKMAN NYDEGGER

(57) ABSTRACT

A recording apparatus includes a carriage on which the recording head is mounted and in which a first measuring area and a second measuring area are provided, a platen disposed to face the recording head, a reference portion disposed on the platen at a position faceable by the recording head; a distance sensor provided on either of the carriage or the reference portion and configured to measure a distance between a measuring area and the reference portion, and a controller that determines an inclination of the carriage with respect to the platen based on a measurement result of the distance sensor, and controls execution of a predetermined process.

14 Claims, 8 Drawing Sheets

RECORDING APPARATUS

The present application is based on, and claims priority from JP Application Serial Number 2021-117685, filed Jul. 16, 2021, the disclosure of which is hereby incorporated by reference herein in its entirety.

BACKGROUND

1. Technical Field

The present disclosure relates to a recording apparatus.

2. Related Art

In the related art, a recording apparatus that performs recording by causing ink ejected from a recording head to adhere to a recording medium has been known. For example, JP-A-2016-88022 discloses a recording apparatus that measures distances between a recording medium and a recording head using an acoustic wave type distance sensor. Further, for example, JP-A-2018-199280 discloses a recording apparatus that adjusts a landing position of a liquid droplet ejected from a recording head.

However, in the recording apparatuses described in JP-A-2016-88022 and JP-A-2018-199280, there is a problem when the carriage on which the recording head is mounted is inclined with respect to the platen, there is a problem that it takes time and effort to adjust the tilt. Specifically, in a large format type recording apparatus, it is necessary to adjust the inclination using a jig or the like at the time of installation or maintenance. When a deviation occurs between the above-described inclination and the initial value of the inclination, it is difficult to cause the ink ejected from the recording head to adhere to a desired position, and the quality of an image or the like to be printed may deteriorate. In particular, the above-described tendency is conspicuous in a recording apparatus having a large carriage on which a plurality of recording heads are mounted.

On the other hand, JP-A-2016-88022 does not disclose a method for reducing the inclination of the carriage with respect to the platen even if the inclination increases. In addition, in JP-A-2018-199280, when the inclination of the carriage becomes large, there is a concern that the adjustable range of the landing position of the liquid droplet may be exceeded. That is, there is a need for a recording apparatus that easily adjusts a shift of an ink adhering position due to an inclination of a carriage.

SUMMARY

A recording apparatus includes a recording head that performs recording by ejecting a liquid onto a recording medium, a carriage on which the recording head is mounted and in which a first measuring area and a second measuring area are provided as measuring areas, a facing surface disposed to face the recording head, a reference portion disposed on the facing surface at a position faceable by the recording head, a measuring section provided on either the carriage or the reference portion and configured to measure distances between the measuring areas and the reference portion, and a controller that determines an inclination of the carriage with respect to the facing surface based on a measurement result of the measuring section, and controls execution of a predetermined process for adjusting an adhering position of the liquid, wherein the measuring section measures the distance with respect to the first measuring area and the second measuring area when determining the inclination of the carriage.

DESCRIPTION OF EMBODIMENTS

In an embodiment described below, a large format type recording apparatus used for printing of signage or the like will be exemplified and described with reference to the drawings.

In each of the following drawings, as necessary, XYZ axes are provided as coordinate axes orthogonal to each other, a direction indicated by each arrow is a "+" direction, and a direction opposite to the "+" direction is a "–" direction. The Y-axis extends in a front-back direction of the recording apparatus, and a +Y direction of the recording apparatus is defined as a front side. The X-axis extends in the left-right direction of the recording apparatus, and a +X direction of the recording apparatus is defined as a rightward direction. In addition, a +X direction and a –X direction, which are directions along the X-axis, may be collectively referred to simply as an X-direction. The Z-axis is a virtual axis along the vertical direction, and the +Z direction of the recording apparatus is the upward direction. For convenience of illustration, the size of each member is made different from the actual size.

1. First Embodiment

Figure 1:
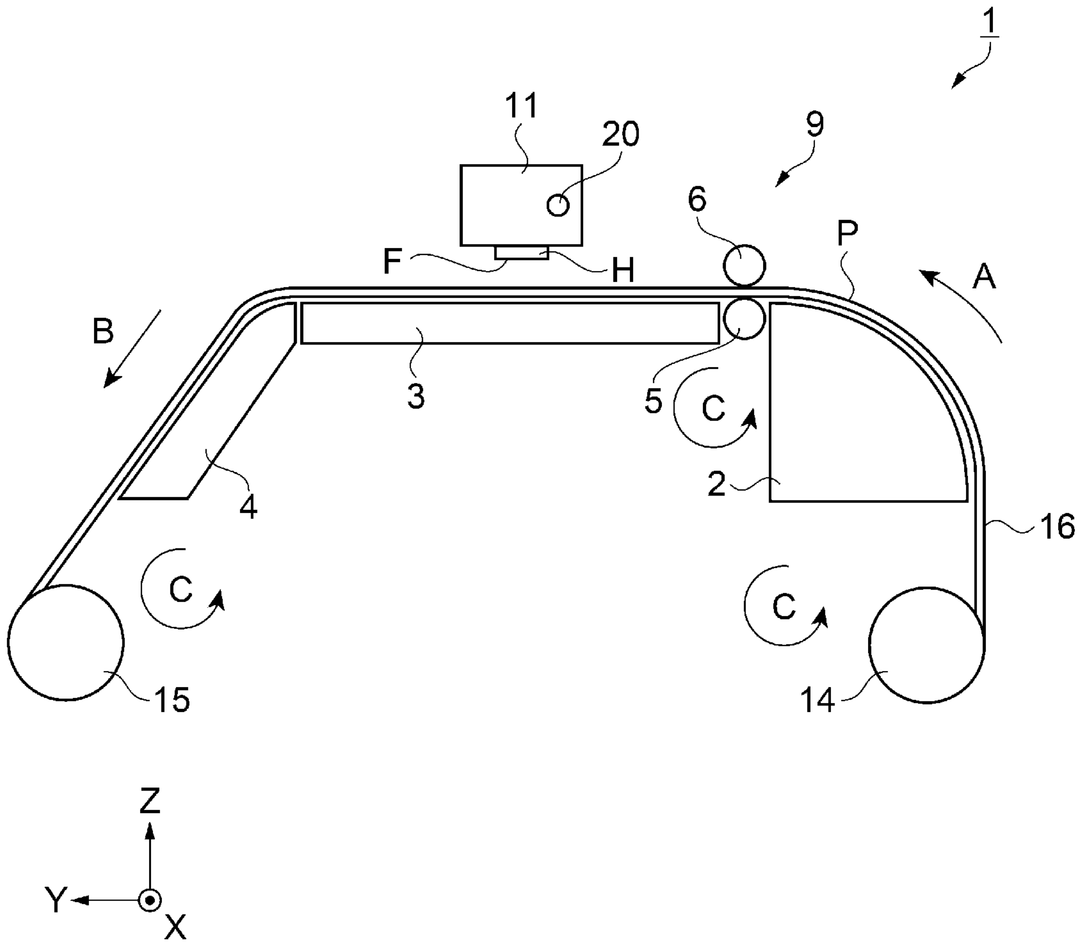
FIG. 1 is a schematic side view showing configuration of a recording apparatus according to a first embodiment.

As shown in FIG. 1, a recording apparatus 1 according to the present embodiment includes a plurality of recording heads H, a carriage 11, and a platen 3 as a facing surface. Although not shown, the recording apparatus 1 also includes a reference portion, a distance sensor as a measuring section, and a controller.

The plurality of recording heads H are mounted on the carriage 11. The platen 3 is disposed to face the plurality of recording heads H. The plurality of recording heads H eject ink, which is a liquid, to the recording medium P supported by the platen 3 for recording. Unless otherwise specified, the description of FIG. 1 will be made assuming a state viewed from the side in the +X direction. Further, in FIG. 1, only one recording head H is used for convenience of illustration. Note that the number of the recording heads H mounted on the carriage 11 is not limited to a plurality.

The plurality of recording heads H is mounted on the lower surface of the carriage 11 so as to face the –Z direction. Each recording head H has a nozzle face F in the −Z direction. The nozzle face F is equipped with nozzles, which will be described later. Droplets of ink are ejected from the nozzles.

The carriage 11 includes an adjustment section (not shown). For example, the adjustment section is interposed between the carriage 11 and a support member for supporting the carriage 11, and adjusts the distance between a reference portion described later and measuring areas of the carriage 11. As the adjustment section, for example, a mechanism that converts a rotary motion into a linear motion such as a ball screw or a stepless eccentric cam is employed. Specifically, in the ball screw, the distance is adjusted by rotating a screw shaft.

A pipe from an ink tank (not shown) is coupled to each recording head H. The ink tank holds the color ink and white ink of each color, respectively. A treatment liquid such as a pretreatment agent or a coating liquid may be stored in the ink tank. In this description, liquids such as the ink and the treatment liquid described above are collectively referred to as ink.

The nozzle face F of each recording head H is arranged so as to face the platen 3 through the recording medium P when the recording apparatus 1 performs recording. The recording head H is an inkjet head driven by a piezoelectric element. The ejection driving section in the recording head H is not limited to the piezoelectric element.

The carriage 11 is disposed opposite to the platen 3. The carriage 11 is supported by a guide shaft 20 extending along the width direction X on the end side in the −Y direction, and reciprocates in the X direction with respect to the recording medium P by a carriage drive section (not shown). In other words, the carriage 11 is scanned in the X-direction intersecting with the +Y direction, which is the transport direction in which the recording medium P is transported on the platen 3. The carriage drive section applies a driving force for reciprocating movement to the carriage by a carriage motor described later. The position of the carriage 11 in the X-direction is detected by an encoder included in a carriage drive section.

The recording apparatus 1 includes, as a transport and support mechanism of the recording medium P, a feeding section 14, support members 2 and 4, a transport section 9, the platen 3, and a winding section 15. In the feeding section 14, the recording medium P in a rolled-up state before recording is unwound and transported to the platen 3. In the winding section 15, the recording medium P after recording is wound into rolled-up state. That is, a rolled-up recording medium P can be applied to the recording in the recording apparatus 1. The form of the recording medium P is not limited to a rolled-up state, and may be a cut sheet. In addition, the recording apparatus 1 may be a flatbed type in which recording is performed without transporting the recording medium P.

The recording medium P is transported from the feeding section 14 by the transport section 9. At this time, the rolled-up state recording medium P is unwound by being rotated, for example, in the rotation direction C so that a recording surface 16 faces upward on the platen 3.

The recording medium P, which is unwound from the feeding section 14 and transported upward, reaches the support member 2. In the support member 2, a region in contact with the recording medium P is formed in an arc shape. The recording medium P is transported in the transport direction A while being in contact with the region of the support member 2. As a result, the recording medium P reaches the transport section 9.

The transport section 9 includes a drive roller 5 and a driven roller 6. The drive roller 5 and the driven roller 6 are disposed between the support member 2 and the platen 3. The driven roller 6 is positioned above the drive roller 5. Each of the drive roller 5 and the driven roller 6 has a cylindrical shape, and their respective rotation axes extend along the X-axis.

The drive roller 5 and the driven roller 6 transport the recording medium P in the +Y direction by rotating with the recording medium P sandwiched therebetween. More specifically, the drive roller 5 and the driven roller 6 unwind and draw out the recording medium P in the rolled-up state from the feeding section 14, and transport the recording medium P to the platen 3 via the support member 2. The drive roller 5 is rotated in a counterclockwise rotation direction C by the drive of a transport motor to be described later. The driven roller 6 rotates clockwise corresponding to the rotation of the drive roller 5. As a result, the recording medium P reaches the platen 3.

The platen 3 has an upper surface formed in a flat plate shape. The upper surface of the platen 3 is substantially along the X-Y plane. On the platen 3, ink droplets are attached to the recording medium P from the plurality of recording heads H. At this time, the recording medium P is transported in the +Y direction while being supported by the upper surface of the platen 3. Further, the plurality of recording heads H are scanned in the direction along the X-axis. Therefore, the plurality of recording heads H can scan the recording medium P in a direction relatively along the X-axis and can move in a direction relatively along the Y-axis. As a result, an image, text, design patterns, and the like are formed on the recording medium P, and recording is performed. Then, the recording medium P reaches a support member 4 from the platen 3.

The support member 4 is arranged in the +Y direction of the platen 3. The support member 4 is inclined downward in the +Y direction. Due to the inclination of the support member 4, the support member 4 guides the transport direction of the recording medium P from the +Y direction to the transport direction B. The winding section 15 is provided at the tip of the inclination of the support member 4.

The winding section 15 is driven by a motor (not shown) to rotate, for example, in the rotation direction C to wind the recording medium P in the rolled-up state.

Figure 2A:
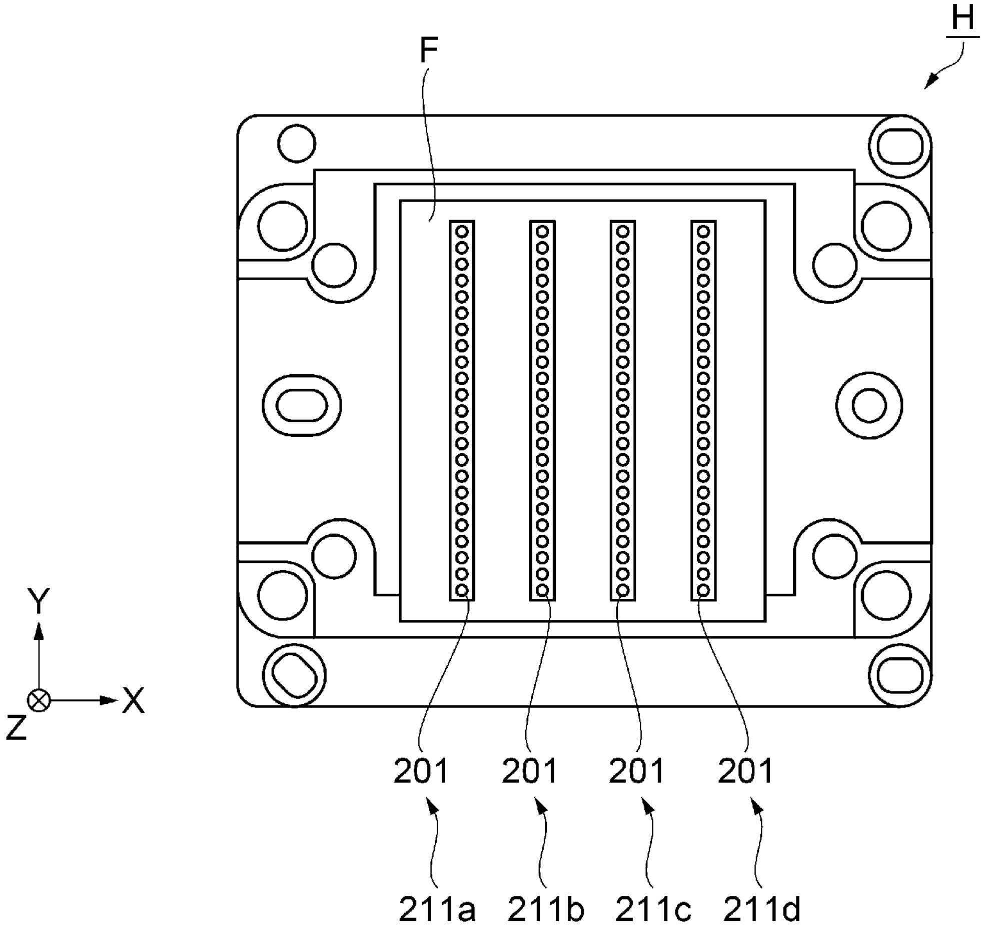
FIG. 2A is a plan view showing configuration of the recording head.
Figure 2B:
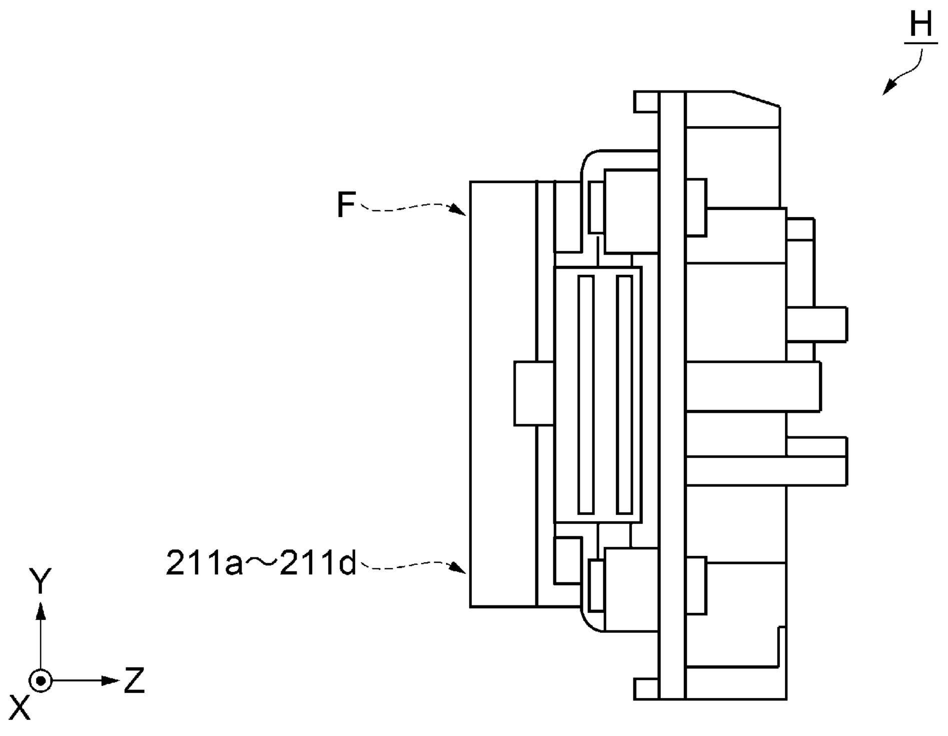
FIG. 2B is a side view showing configuration of the recording head.

As shown in FIGS. 2A and 2B, in plan view from the −Z direction, the recording head H is substantially rectangular, and a substantially rectangular nozzle face F is provided at the center of the recording head H. The nozzle face F is substantially along the X-Y plane. The nozzle face F protrudes in the −Z direction from the main body of the recording head H in a side view from the +X direction.

On the nozzle face F, four nozzle arrays 211*a*, 211*b*, 211*c*, 211*d* are arranged in this order in the +X direction. Each nozzle array 211*a*, 211*b*, 211*c*, 211*d* extends along the Y-axis. Each of the nozzle arrays 211*a*, 211*b*, 211*c*, 211*d* is composed of a plurality of nozzles 201. Droplets of the corresponding type of ink are ejected from each nozzle 201 of the nozzle arrays 211*a*, 211*b*, 211*c*, 211*d*. The nozzle arrays disposed on the nozzle face F are not limited to the above-described configuration.

Figure 3:
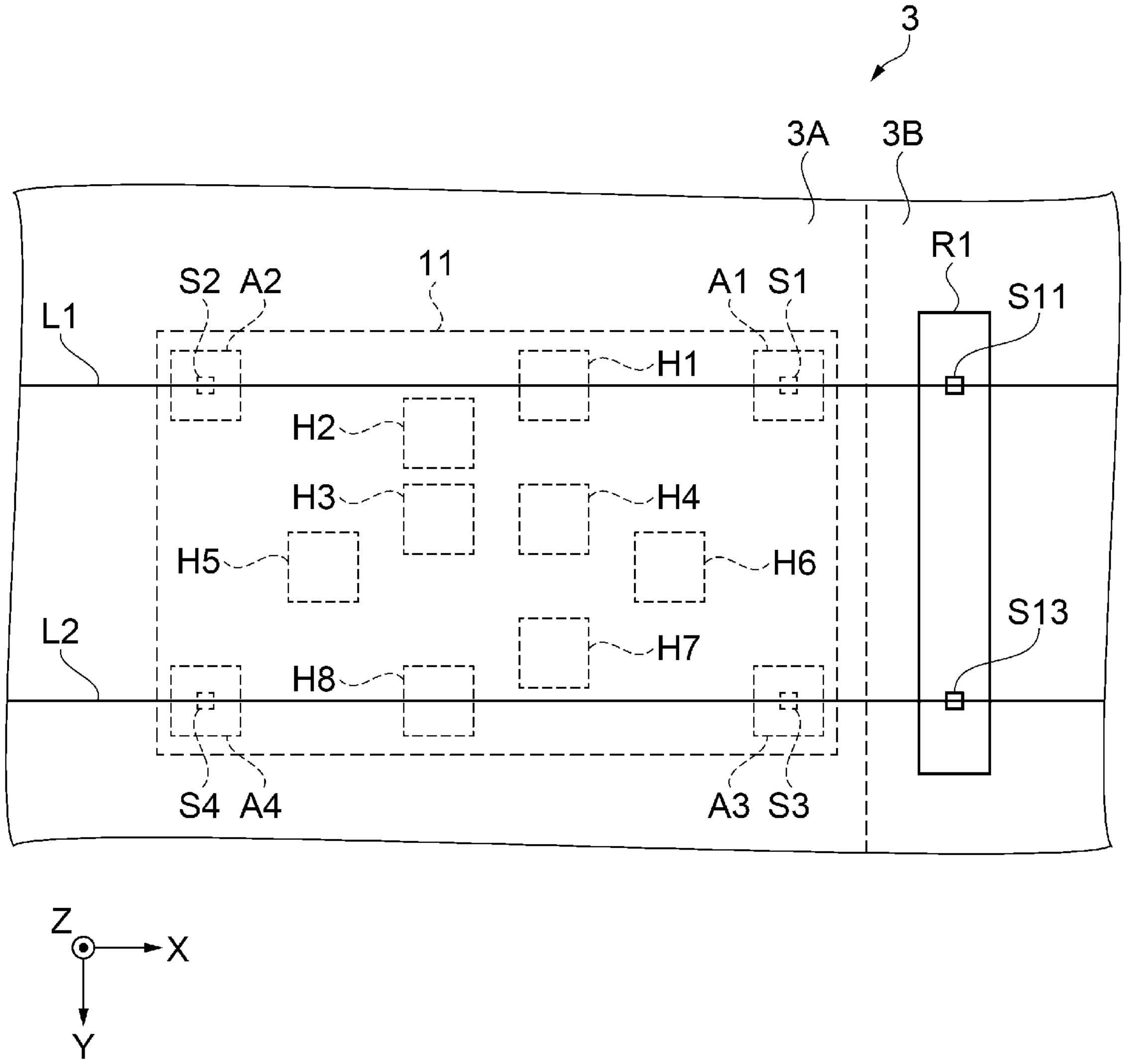
FIG. 3 is a schematic plan view showing an arrangement of a measuring area and a reference portion.

As shown in FIG. 3, the platen 3 includes platens 3A and 3B adjacent to each other. Here, in FIG. 3, the carriage 11 and the like are indicated by broken lines, and the vicinity of a boundary between the platen 3A and the platen 3B in the +X direction in a range scanned by the carriage 11 is illustrated in an enlarged manner. In the explanation of FIG. 3, a state viewed from above in plan view will be described unless otherwise specified.

The platen 3A is a transport path along which a recording medium P (not shown) is transported. In other words, the range of the platen 3A in the direction along the X-axis is also a range in which the carriage 11 is scanned during recording by the recording apparatus 1.

The platen 3B is disposed to the outside, in the +X direction, of the platen 3A, which is a transport path along which the recording medium P is transported. A boundary between the platen 3A and the platen 3B extends along the Y-axis. A reference portion R1 is disposed on the platen 3B. The platen 3B is not limited to being disposed in the +X direction with respect to the platen 3A, and may be disposed in the −X direction.

The reference portion R1 is a measurement position on the platen 3 side when measuring the distances between the carriage 11 and the platen 3. The reference portion R1 has a substantially rectangular shape elongated in the direction along the Y-axis. The reference portion R1 is arranged at a position faceable by the plurality of recording heads H. More specifically, the reference portion R1 is provided on the platen 3B, for example, between the platen 3A and the maintenance position of the carriage 11 in the recording apparatus 1. That is, the carriage 11 faces the reference portion R1 during scanning in the +X direction other than during recording by the recording apparatus 1. The reference portion R1 is provided outside the transport path of the recording medium P. Therefore, the reference portion R1 is less likely to come into contact with the recording medium P, and adhesion of dust and the like derived from the recording medium P can be suppressed to keep the reference portion R1 clean.

The carriage 11 has a substantially rectangular shape. Eight recording heads H1, . . . , H8 are mounted as the plurality of recording heads H on the lower surface of the carriage 11. Therefore, when the lower surface is inclined with respect to the platen 3, there is a possibility that the adhering position of the ink ejected from each recording head H may deviate from a desired position. For this reason, in the recording apparatus 1 of the embodiment, the adhering position of the ink is adjusted according to the inclination of the carriage 11 with respect to the platen 3 by predetermined processing by a controller, which will be described later. The number and arrangement of the recording heads H are not limited to the above-described configuration.

In the following description, the inclination of the carriage 11 with respect to the platen 3 is also simply referred to as the inclination of the carriage 11. The inclination of the carriage 11 is an inclination of the lower surface of the carriage 11 with respect to the upper surface of the platen 3.

Four measuring areas A1, A2, A3, A4 are provided at four vertices of the lower surface of the carriage 11. Specifically, on the lower surface of the carriage 11, a measuring area A1 is arranged corresponding to a right rear corner, a measuring area A2 is arranged corresponding to a left rear corner, a measuring area A3 is arranged corresponding to a right front corner, and a measuring area A4 is arranged corresponding to a left front corner. Any two of the four measuring areas A1, A2, A3, A4 correspond to the first measuring area and the second measuring area of the present disclosure. Specifically, for example, the first measuring area is the measuring area A1, and the second measuring area is the measuring area A4.

A third measuring area may be further provided as one of the measuring areas A. The third region is, for example, the measuring area A2. When the carriage 11 is viewed from above, the measuring area A1, which is the first measuring area, the measuring area A4, which is the second measuring area, and the measuring area A2, which is the third measuring area, are not linearly arranged.

In order to detect the inclination of the carriage 11, distances in the direction along the Z-axis between each of the measuring areas A1, A2, A3, A4 and the reference portion R1 are measured. In the following description, the measuring areas A1, A2, A3, A4 may be collectively referred to simply as measuring areas A.

Each of the measuring areas A is provided with a distance sensor S, which is a measuring section, facing downward. That is, the plurality of distance sensors S are provided on the carriage 11. In addition, since the distance sensor S is provided facing downward similarly to the nozzle face F of the recording head H, it is difficult for contaminants such as dust to adhere to the distance sensor S, and it is possible to maintain the performance of the distance sensor S. The distance sensor S measures a distance along the Z-axis between each measuring area A of the carriage 11 and the reference portion R1 of the platen 3.

The multiple distance sensors S include distance sensors S1, S2, S3, S4 to each measuring area A. The distance sensor S1 corresponds to the measuring area A1, the distance sensor S2 corresponds to the measuring area A2, the distance sensor S3 corresponds to the measuring area A3, and the distance sensor S4 corresponds to the measuring area A4.

The measuring areas A1 and A2 and the distance sensors S1 and S2 are arranged on a virtual straight line L1 along the X-axis. The measuring areas A3 and A4 and the distance sensors S3 and S4 are arranged on a virtual straight line L2 along the X-axis. The distance sensors S1 and S3, and the distance sensors S2 and S4, are arranged along the Y-axis. With the above arrangement, when the carriage 11 is scanned in the +X direction beyond the platen 3A toward the platen 3B, the distance sensors S1 and S3, and then the distance sensors S2 and S4, oppose the reference portion R1. Therefore, as the carriage 11 is scanned, the reference portion R1 sequentially faces the measuring areas A1 and A3, and the measuring areas A2 and A4.

The distance sensor S is not limited to being provided on the carriage 11, and may be provided on either the carriage 11 or the reference portion R1 of the platen 3. For example, instead of the distance sensors S1, S2, S3, S4, distance sensors S11 and S13 may be provided in the reference portion R1. In this case, in the reference portion R1, the distance sensor S11 is arranged on the virtual straight line L1, and the distance sensor S13 is arranged on the virtual straight line L2.

As a result, when the carriage 11 is scanned toward the platen 3B, the measuring area A1 faces the distance sensor S11 and the measuring area A3 faces the distance sensor S13. Then, the measuring area A2 faces the distance sensor S11 and the measuring area A4 faces the distance sensor S13.

By arranging the distance sensors S11 and S13 on the reference portion R1, since the platen 3 does not move, the measurement accuracy of the distance sensor S can be improved. Further, the distance sensors S11 and S13 are provided outside the transport path of the recording medium P and it is difficult for them to contact the recording medium P. Therefore, the adhesion of dust or the like derived from the recording medium P can be suppressed, and the distance sensors S11 and S13 can be kept clean. Further, the distance sensor S is shared by the plurality of measuring areas A, and the number of distance sensors S can be reduced.

The distances between the respective measuring areas A and the reference portion R1 are measured after bringing both into confrontation in a direction along the Z-axis. The reference portion R1 is sequentially brought into confrontation with each measuring area A as the carriage 11 is scanned in the X-direction. At this time, the distances between the measuring areas A and the reference portion R1 are measured sequentially.

The distance sensor S is a non-contact distance measuring device. Examples of the distance sensor S include an optical type, an acoustic wave type, and an ultrasonic type. In the present embodiment, an ultrasonic sensor including a thin-film piezoelectric element described below is employed as the distance sensor S.

The ultrasonic sensor includes a substrate having an opening penetrating in a thickness direction, a diaphragm closing the opening, a thin-film piezoelectric element provided at a position corresponding to the opening on a back surface of the diaphragm, and an elastic layer inside the opening and facing the thin-film piezoelectric element via the diaphragm. The vibration region of the diaphragm and the thin-film piezoelectric element constitute one ultrasonic transducer.

In the ultrasonic sensor, by applying a pulse voltage of a predetermined frequency between two electrodes of the thin-film piezoelectric element, the thin-film piezoelectric element is bent and the vibration region vibrates, and ultrasonic waves are transmitted from the opening portion. When the ultrasonic wave propagated toward the ultrasonic sensor vibrates the vibration region of the diaphragm, a potential difference is generated between the two electrodes of the thin-film piezoelectric element. By detecting the potential difference, it is possible to detect the timing of the oscillation and reception of the ultrasonic wave. Further, the distance sensor S includes a temperature and humidity sensor, and calculates the speed of sound from the measured temperature and humidity. The temperature and humidity sensor may not be located at the same position as the distance sensor S.

According to the configuration described above, the distance between the ultrasonic sensor and the measurement target can be measured by transmitting the ultrasonic wave to the measurement target and receiving the ultrasonic wave reflected by the measurement target. The ultrasonic sensor of the present embodiment is a small ultrasonic sensor specialized for a case where an object is at a short distance.

According to an ultrasonic sensor including the thin-film piezoelectric element, the spatial resolution in distance measurement can be improved as compared with an ultrasonic sensor not using a thin-film piezoelectric element. Further, miniaturization is easy as compared with an optical type or acoustic wave type. Therefore, the distance sensor S becomes small in size and light in weight, and can be easily mounted on the carriage 11. Further, the ultrasonic sensor has an advantage that it is less affected by the color of the measurement target and the reflectance of the surface than the optical type.

The distances along the Z-axis between each measuring area A and the reference portion R1 are measured by the distance sensor S. That is, when calculating the inclination of the carriage 11, the distance sensor S measures the distance at least in the measuring area A1 and the measuring area A4. The distances, which are a measurement result, are converted into information about the inclination of the carriage 11 by a controller 118 described later. As long as the information on the inclination can be obtained, the number and arrangement of the measuring areas A are not limited to the above-described configuration.

Specifically, in plan view of the carriage 11 from below, in other words, when the lower surface of the carriage 11 is viewed from the −Z direction, the three measuring areas A may be disposed at the respective vertices of the triangle. That is, in plan view of the carriage 11 from below, the three measuring areas A must not be arranged on the same straight line. For example, information about the inclination of the carriage 11 may be obtained in three measuring areas A by omitting any one of the four measuring areas A1, A2, A3, A4. In the configuration having three measuring areas A, the inclination in two directions can be detected. The number of measuring areas A is not limited to three and four, two or more is sufficient. Even in the configuration having two measuring areas A, the inclination in at least one direction can be detected.

Figure 4:
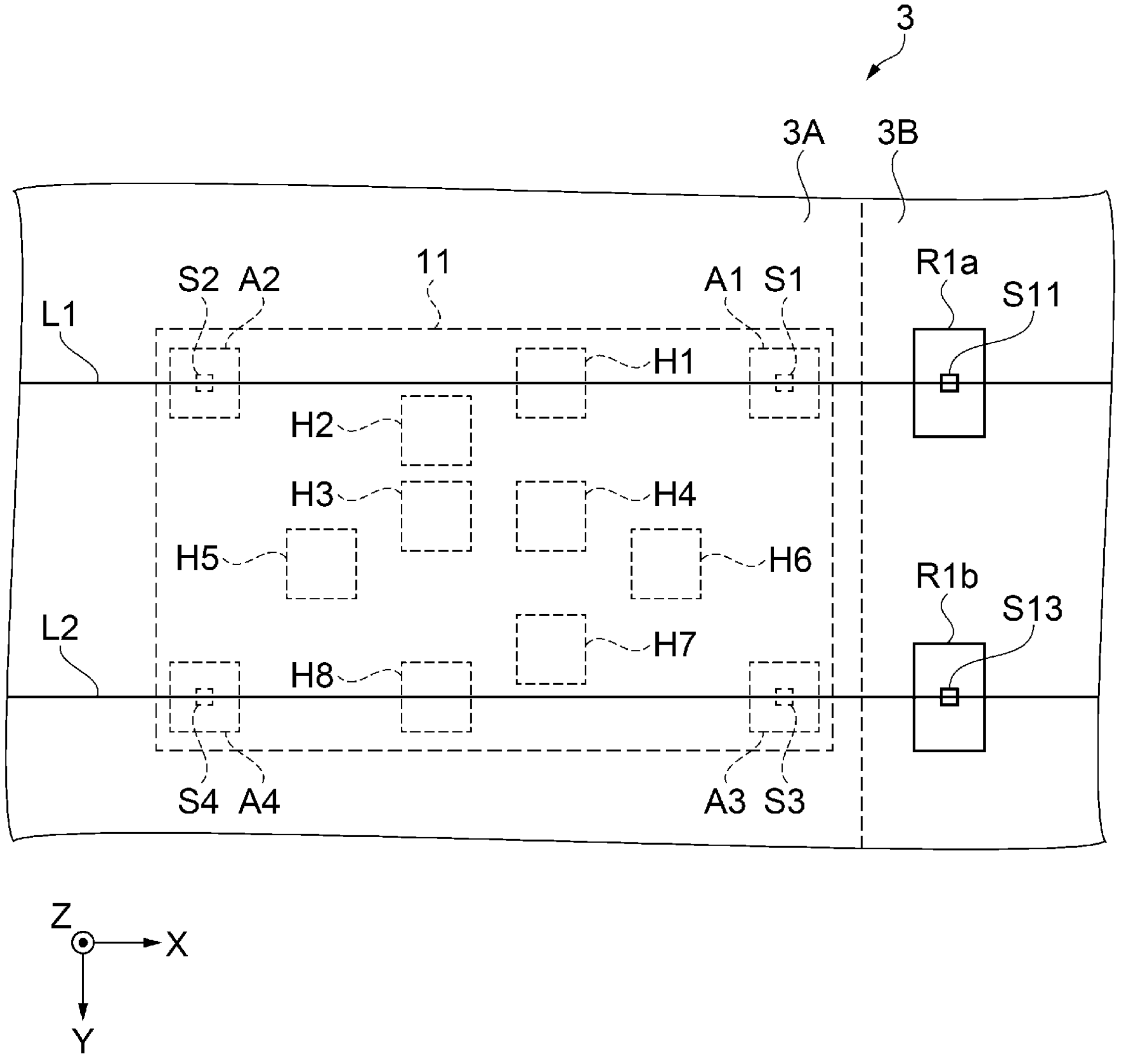
FIG. 4 is a schematic plan view showing another form of the reference portion.

As illustrated in FIG. 4, the reference portion R1 may be divided into a reference portion R1*a* corresponding to the distance sensors S1 and S2 and a reference portion R1*b* corresponding to the distance sensors S3 and S4. In this case, the reference portion R1*a* is arranged on the virtual straight line L1, and the reference portion R1*b* is arranged on the virtual straight line L2. Further, the distance sensor S11 may be provided on the reference portion R1*a*, and the distance sensor S13 may be provided on the reference portion R1*b*.

Figure 5:
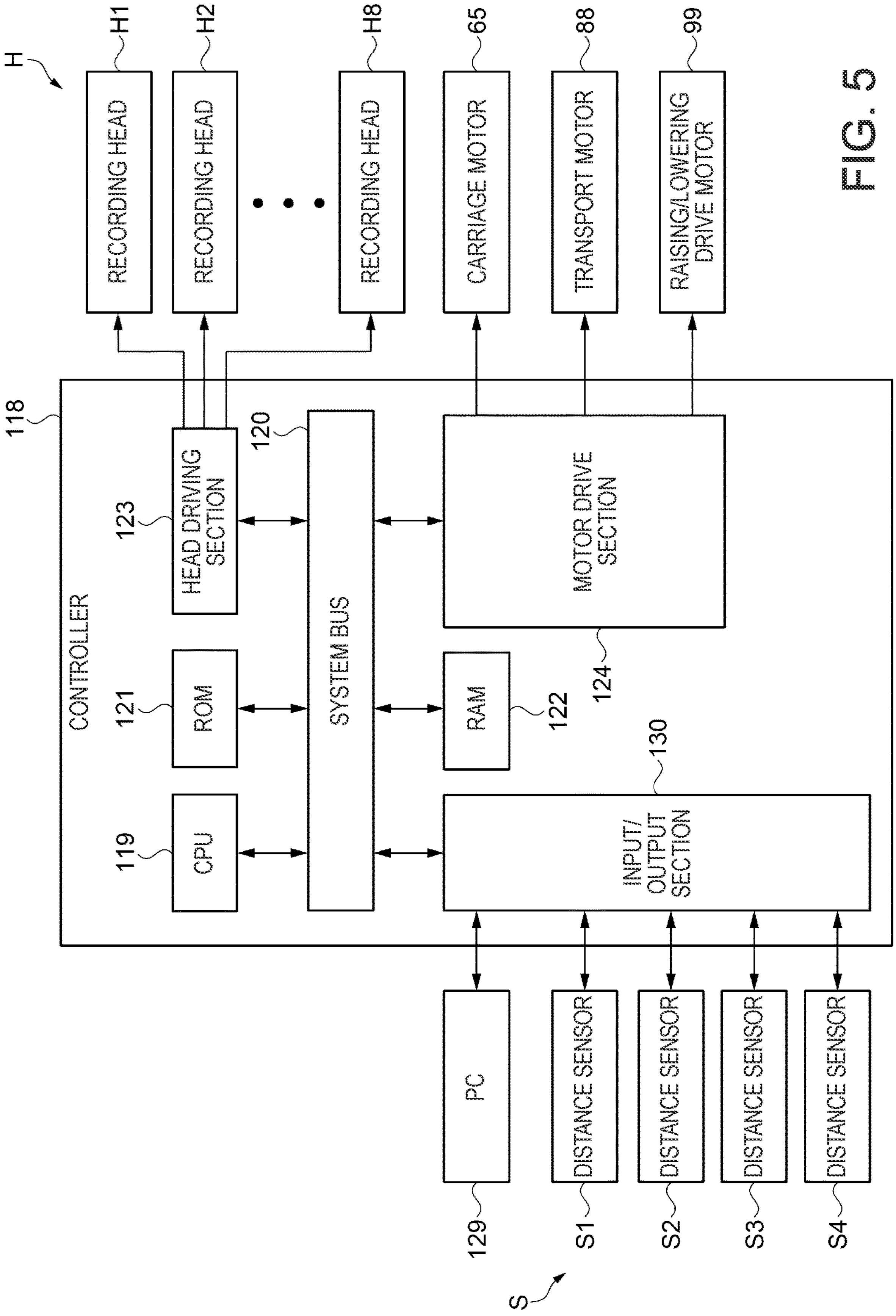
FIG. 5 is a block diagram of the recording apparatus.

As shown in FIG. 5, the controller 118 includes a central processing unit (CPU) 119, a system bus 120, a read only memory (ROM) 121, a random access memory (RAM) 122, a head driving section 123, a motor driving section 124, and an input/output section 130.

The CPU 119 controls the entire recording apparatus 1. The CPU 119 Is electrically coupled to the ROM 121, the RAM 122 and the head driving section 123 via the system bus 120. The ROM 121 stores various control programs, a maintenance sequence, and the like, to be executed by the CPU 119. The RAM 122 stores data temporarily. The head driving section 123 drives the recording heads H1, H2, . . . , H8 which are a plurality of recording heads H.

The CPU 119 is electrically coupled to the motor driving section 124 via the system bus 120. The motor driving section 124 is electrically coupled to a carriage motor 65, a transport motor 88, and a raising/lowering drive motor 99.

The carriage motor 65 is included in the above-described carriage drive section. The carriage motor 65 reciprocates the carriage 11 in the X-direction. The transport motor 88 drives the above-described drive roller 5 to transport the recording medium P. The raising/lowering drive motor 99 is coupled to the support member of the carriage 11 described above and moves the support member in the direction along the Z-axis. As a result, the distances between the carriage 11 and the plurality of recording heads H, and the platen 3 and the recording medium P are uniformly changed.

The CPU 119 Is electrically coupled to the input/output section 130 via the system bus 120. The input/output section 130 is electrically coupled to the distance sensors S1, S2, . . . , S8, which are the measuring section, and a personal computer (PC) 129. The PC 129 is an information device that inputs recording data and the like to the recording apparatus 1.

At least three of the distance sensors S1, S2, S3, S4 measure the distances between each measuring area A and the reference portion R1 for at least three corresponding measuring areas A. The distance sensors S11 and S13 described above may be used instead of the distance sensors S1, S2, S3, S4. Alternatively, reference portions R1*a*, R1*b* may be used as the reference portion R1.

The controller 118 determines the inclination of the carriage 11 with respect to the platen 3 based on the information of the distances between the respective measuring areas A and the reference portion R1, which are the measurement results of the distance sensor S. In the recording apparatus 1, the distances between each measuring area A and the reference portion R1 are measured in a state in which the arrangement of each member before shipment is adjusted. The measurement result determined here is stored in the RAM 122 as the initial information of the inclination of the carriage 11 adjusted in advance. In addition, the measurement of the distance is also performed at an arbitrary time such as after shipment, after transportation of the recording apparatus 1, after installation, after use for a certain period time, and after replacement of the recording head H. These are also stored in the RAM 122 as information about the inclination at each point in time.

The controller 118 controls execution of a predetermined process for adjusting the adhering position of the ink from information on the inclination of the carriage 11 based on the measurement result of the distance sensor S. By a predetermined process of the controller 118, the ink adhering position ejected by each recording heads H1, H2, . . . , H8 is adjusted. Note that the information about the distances between the measuring areas A and the platen 3 by the distance sensor S does not include the thickness of the recording medium P. The adjustment corresponding to the thickness of the recording medium P may be performed by raising/lowering the carriage 11 by the raising/lowering drive motor 99.

The controller 118 stores information about the inclination of the carriage 11 with respect to the platen 3 in advance when the carriage 11 is adjusted to the correct position, and executes a predetermined process based on the measurement result and the information on the inclination. According to this configuration, by referring to the information about the inclination of the carriage 11 in the state of being adjusted to the correct position, it is possible to easily adjust the ink adhering position by performing correction for reducing the difference as a predetermined process.

The predetermined process by the controller 118 includes, as software adjustment, correcting at least one of ejection timing or ejection speed of ink droplets of each recording head H. In addition, the above-described predetermined process also includes the above-described adjustment by the adjustment section, which is a mechanical adjustment, and assistance when the adjustment is manually performed.

First, the software adjustment as the predetermined process will be described. For example, the ROM 121 stores in advance a plurality of ejection conditions such as the ejection timing and the ejection speed of ink droplets corresponding to the inclination of the carriage 11. The controller 118 reads out from the ROM 121 the ejection condition corresponding to the inclination of the carriage 11 obtained from the measurement result. Next, the controller 118 corrects the ejection timing and the ejection speed of the ink droplet based on the ejection conditions described above, and controls the head driving section 123 via the system bus 120.

The adjustment of the ejection timing also includes correction of the ejection timing of ink droplets in each recording head H, which are scanned together with the carriage 11 during recording. As a result, the microscopic position where the ink droplet adheres to the recording medium P is corrected. In addition, the adjustment of the ejection speed includes correction of the ejection speed of the ink droplets from each recording head H, which are being scanned during recording. As a result, the microscopic position where the ink droplet adheres to the recording medium P is corrected.

As described above, the ejection timing and the ejection speed of the ink droplet are corrected as software adjustment, and the adhering position of the ink droplet can be easily adjusted.

Next, the mechanical adjustment of the predetermined processing will be described. For example, the difference between the initial information stored in the RAM 122 and the measurement result at an arbitrary time is mechanically eliminated via the adjustment section. That is, as the predetermined process, the distances between the reference portion R1 and the respective measuring areas A are automatically adjusted so as to return to the initial state by controlling the adjustment section.

When a ball screw or an eccentric cam is used as the adjustment section, these are rotationally driven by a motor (not shown) controlled by the controller 118. The above-described adjustment may also be performed by the height adjustment of the carriage 11 performed by the raising/lowering drive motor 99. This makes it possible to easily adjust the ink adhering position on the recording medium P. Note that a plurality of adjustment sections may be provided. In the case of automatic adjustment, both software and mechanical adjustment may be performed. For example, adjustment up to a predetermined range may be corrected by software adjustment, and adjustment beyond the predetermined range may be performed by mechanical adjustment.

The above-mentioned mechanical adjustment may be performed manually. To be specific, the controller 118 may notify adjustment information for adjusting the distances between the reference portion R1 and each recording head H by the adjustment section in manual adjustment via the adjustment section.

Examples of the adjustment information include information on the difference between the initial information of the inclination of the carriage 11 stored in the RAM 122 and the measurement result at an arbitrary time, guidance information about an appropriate adjustment amount in the adjustment section, and information indicating that the appropriate adjustment has been completed. Examples of means for notifying include a display panel (not shown) of the recording apparatus 1 or a display of the PC 129, a notification sound or voice, using an indicator lamp, and the like. According to this, work using a jig or the like for correcting the inclination of the carriage 11 becomes unnecessary, and the ink adhering position on the recording medium P can be easily adjusted.

It is desirable that the above-described adjustment information be updated sequentially at a predetermined time interval. In other words, during manual adjustment, it is possible to proceed with the adjustment while confirming the updated adjustment information. Therefore, the adjustment operation can be performed more easily.

According to this embodiment, the following effects can be obtained. It is possible to easily adjust deviation of the ink adhering position caused by inclination of the carriage 11. More specifically, with respect to at least three measuring areas A in the carriage 11, the distances between the measuring areas A and the reference portion R1 are measured. Since the three measuring areas A are arranged at the vertices of the triangle, the inclinations of the carriage 11 in the two directions with respect to the platen 3 are obtained from the measurement results. Accordingly, the ink adhering position on the recording medium P is adjusted by predetermined processing by the controller 118. That is, it is possible to provide the recording apparatus 1 which easily adjusts the deviation of the ink adhering position caused by the inclination of the carriage 11.

In the present embodiment, the distances between the measuring areas A and the reference portion R1 are measured for at least three of the distance sensors S1, S2, S3, S4 and at least three corresponding measuring areas A. However, the number of the distance sensors S and the measuring areas A are not limited to three. In a configuration in which the −Y direction end portion side of the carriage 11 is supported by the guide shaft 20, an inclination in which the +Y direction end portion side of the carriage inclines downward is likely to occur due to the weight of the carriage 11. In such a configuration, by measuring the distances between the two measuring areas A and the reference portion R1 at least along the Y direction, it is possible to detect an inclination in the Y direction in which an inclination is likely to occur.

2. Second Embodiment

In a recording apparatus according to the present embodiment, the arrangement of the reference portion R1 is changed with respect to the recording apparatus 1 of the first embodiment. In the following description, the same components as those in the first embodiment are denoted by the same reference numerals, and a repetitive description thereof will be omitted.

Figure 6:
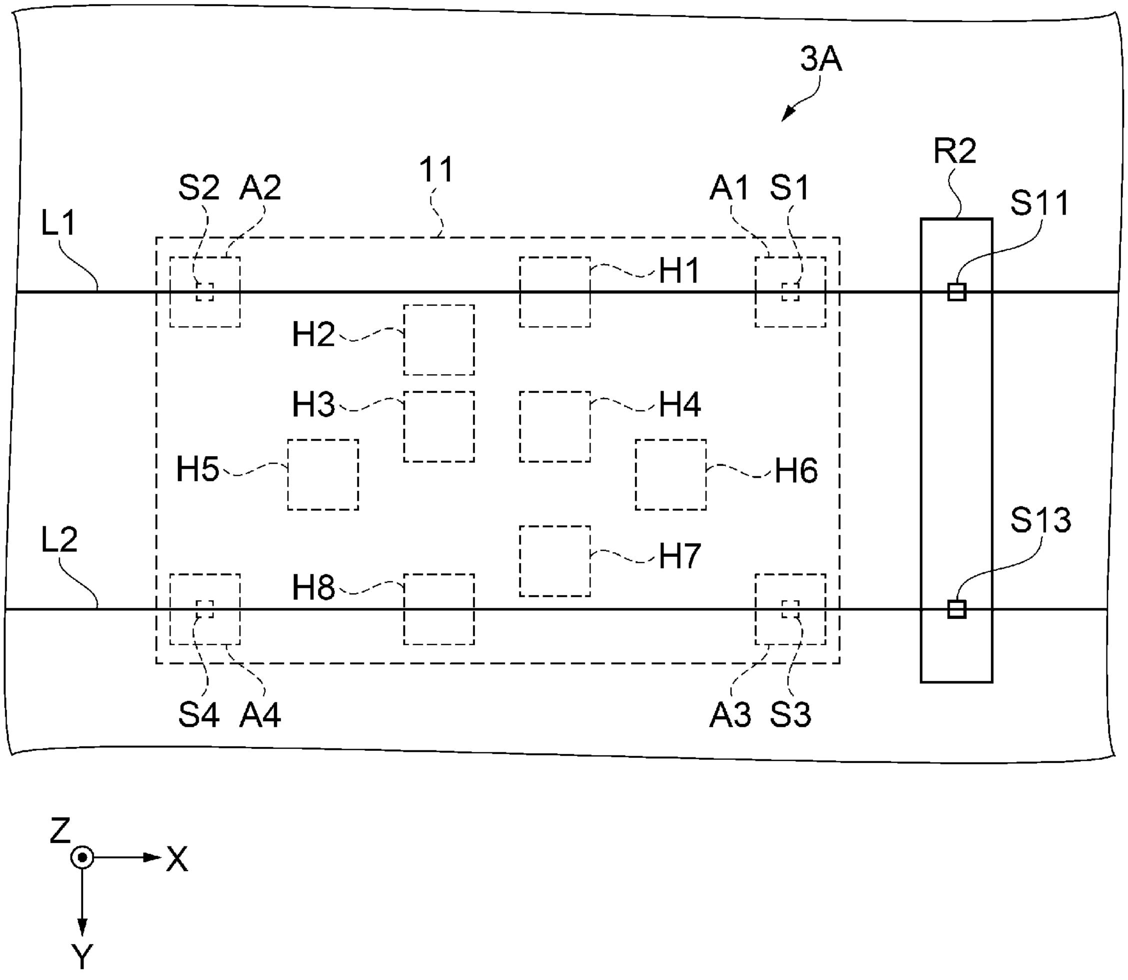
FIG. 6 is a schematic plan view showing an arrangement of a measuring area and a reference portion according to a second embodiment.

As shown in FIG. 6, in the recording apparatus of the present embodiment, a reference portion R2 is provided on the platen 3A. As described above, the platen 3A is inside the scanning range in which the carriage 11 is scanned during recording. In other words, the reference portion R2 is provided at a position that faces each measuring area A when the carriage is scanned within the scanning range during recording. The reference portion R2 has a substantially rectangular shape elongated in the direction along the Y-axis in plan view from above.

In this embodiment, as in the first embodiment, the distance sensor S is provided on either the carriage 11 or the reference portion R2.

According to this embodiment, the same effects as those of the first embodiment can be obtained.

3. Third Embodiment

In a recording apparatus according to this embodiment, the arrangement and form of the reference portion R2 are changed from those of the recording apparatus according to the second embodiment. In the following description, the same components as those in the first embodiment are denoted by the same reference numerals, and a repetitive description thereof will be omitted.

Figure 7:
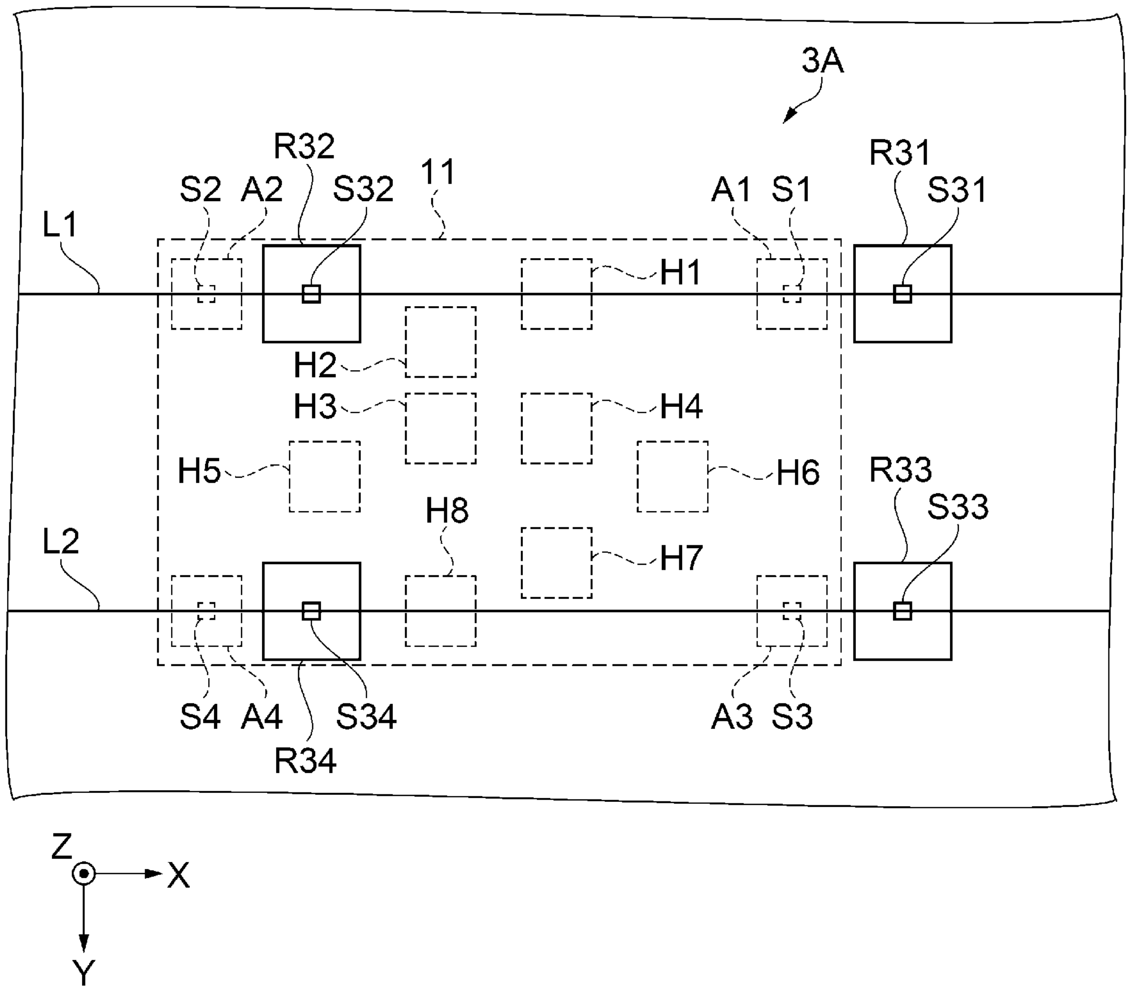
FIG. 7 is a schematic plan view showing an arrangement of a measuring area and a reference portion according to a third embodiment.

As shown in FIG. 7, in the recording apparatus of the present embodiment, a plurality of reference portions R31, R32, R33, R34 are provided on the platen 3A. Here, for the convenience of illustration, FIG. 7 shows a state in which each measuring area A and the reference portions R31, R32, R33, R34 are slightly shifted in the X-direction.

The reference portions R31, R32, R33, R34 do not have an integral form as in the second embodiment, but are divided into four portions corresponding to the arrangement of each measuring area A. Each of the reference portions R31, R32, R33, R34 has a substantially rectangular shape in plan view from above and has an area that overlaps with each of the measuring areas A. Here, any two of the four reference portions R31, R32, R33, R34 correspond to a first reference portion and a second reference portion of the present disclosure. For example, when the first measuring area is the measuring area A1, the first reference portion is the reference portion R31, and when the second measuring area is the measuring area A4, the second reference portion is the reference portion R34.

The reference portions R31, R32, R33, R34 simultaneously face the measuring areas A on the carriage 11 when the carriage 11 is scanned during recording. To be specific, the measuring area A1 and the reference portion R31, the measuring area A2 and the reference portion R32, the measuring area A3 and the reference portion R33, and the measuring area A4 and the reference portion R34 face each other at the same time.

As the distance sensor S, distance sensors S31, S32, S33, S34 may be provided on the platen 3A in place of the distance sensors S1, S2, S3, S4. The distance sensor S31 may be disposed in the reference portions R31, the distance sensor S32 may be disposed in the reference portion R32, the distance sensor S33 may be disposed in the reference portion R33, and the distance sensor S34 may be disposed in the reference portion R34. In this case, the distance sensors S31 and S32 are provided on the virtual straight line L1, and the distance sensors S33 and S34 are provided on the virtual straight line L2.

As described above, the distances between each measuring area A and the corresponding reference portions R31, R32, R33, R34 can be measured simultaneously, so the measurement can be performed in a short time.

Further, the arrangement of the reference portions R31, R32, R33, R34 are not limited to the arrangement in which all the reference portions R31, R32, R33, R34 face the respective measuring areas A at the same time. For example, in a case where there is minute undulation or inclination in the X direction of the platen 3A, the reference portions R31, R32, R33, R34 may be provided in an arbitrary region where the influence of the undulation or inclination is reduced. According to this, it is possible to improve the quality of an image or the like to be recorded by suppressing the influence of the undulation or the inclination of the upper surface of the platen 3.

What is claimed is:

1. A recording apparatus comprising:
- a recording head that performs recording by ejecting a liquid onto a recording medium;
- a carriage on which the recording head is mounted and in which a first measuring area and a second measuring area are provided as measuring areas;
- a facing surface disposed to face the recording head;
- a reference portion disposed on the facing surface at a position faceable by the recording head;
- a measuring section provided on either the carriage or the reference portion and configured to measure distances between the measuring areas and the reference portion; and
- a controller that determines an inclination of the carriage with respect to the facing surface based on a measurement result of the measuring section, and controls execution of a predetermined process for adjusting an adhering position of the liquid, wherein
- the measuring section measures, when the inclination of the carriage is determined, the distances with respect to the first measuring area and to the second measuring area.

2. The recording apparatus according to claim 1, further comprising:
- a third measuring area provided as one of the measuring areas, wherein when the carriage is viewed in plan, the first measuring area, the second measuring area, and the third measuring area are not aligned on a straight line.

3. The recording apparatus according to claim 1, wherein the controller stores, in advance, information about inclination, of the carriage with respect to the facing surface, while the carriage is in a state of being adjusted in a correct position, and executes the predetermined processing based on the measurement result and the information about inclination.

4. The recording apparatus according to claim 1, wherein the predetermined process corrects at least one of an ejection timing or an ejection speed of the liquid.

5. The recording apparatus according to claim 4, wherein the carriage is provided with an adjustment section for adjusting distances, from the reference portion, that correspond to the measuring areas and the predetermined process includes a process of correcting at least one of the ejection timing or the ejection speed, and a process of controlling the adjustment section to automatically adjust the distance.

6. The recording apparatus according to claim 1, wherein the carriage is provided with an adjustment section for adjusting distances, from the reference portion, that correspond to the measuring areas and in the predetermined processing, the adjustment section is controlled to automatically adjust the distance.

7. The recording apparatus according to claim 1, wherein the carriage is provided with an adjustment section for adjusting distances, from the reference portion, that correspond to the measuring areas and the predetermined process includes notifying adjustment information for adjusting the distance by the adjustment section.

8. The recording apparatus according to claim 7, wherein the adjustment information is sequentially updated at a predetermined time interval.

9. The recording apparatus according to claim 1, wherein the carriage is scanned in a direction intersecting a transport direction in which the recording medium is transported and the reference portion is provided at a position that is within a scanning range in which the carriage is scanned and that the measuring areas face when the carriage is scanned.

10. The recording apparatus according to claim 9, wherein the reference section is provided with a first reference portion configured to face the first measuring area and a second reference portion configured to face the second measuring area, and when the carriage is scanned, the first measuring area and the first reference portion face each other and the second measuring area and the second reference portion face each other at the same time.

11. The recording apparatus according to claim 9, wherein the reference portion is provided outside a transport path along which the recording medium is transported, and sequentially opposes to the first measuring area and the second measuring area as the carriage is scanned.

12. The recording apparatus according to claim 1, wherein a plurality of the measuring sections are provided on the carriage in correspondence with the measuring areas.

13. The recording apparatus according to claim 1, wherein a plurality of measuring sections are provided in the reference portion in correspondence with the measuring areas.

14. The recording apparatus according to claim 1, wherein the measuring section has an ultrasonic sensor including a thin-film piezoelectric element.

* * * * *